June 28, 1955

H. C. WELLER ET AL 2,711,616

GLASS LEHR

Filed Jan. 19, 1952

INVENTORS:
H.C.WELLER.
C.C.SYKES.
BY
Charles S. Haughey
AGENT.

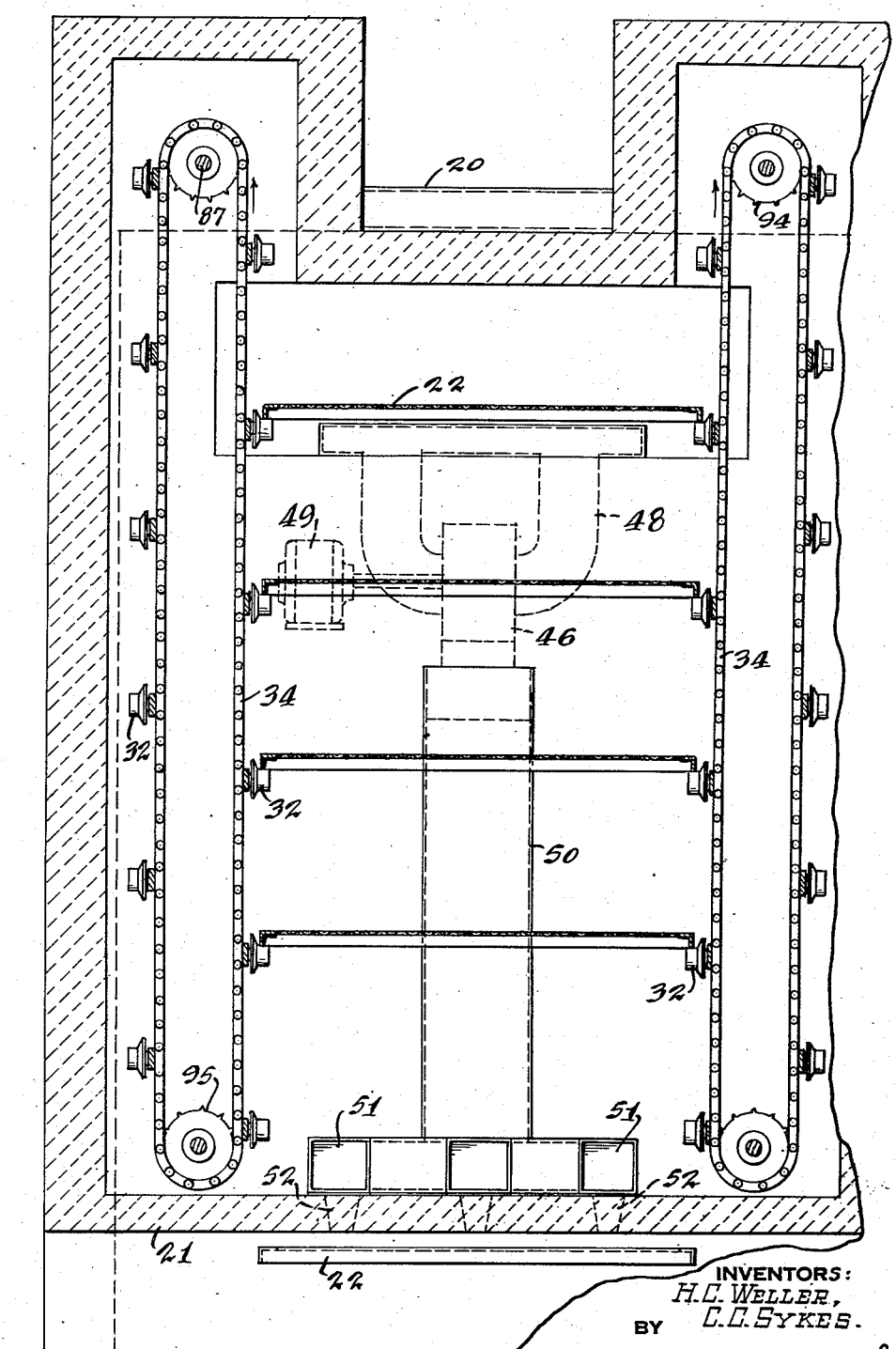

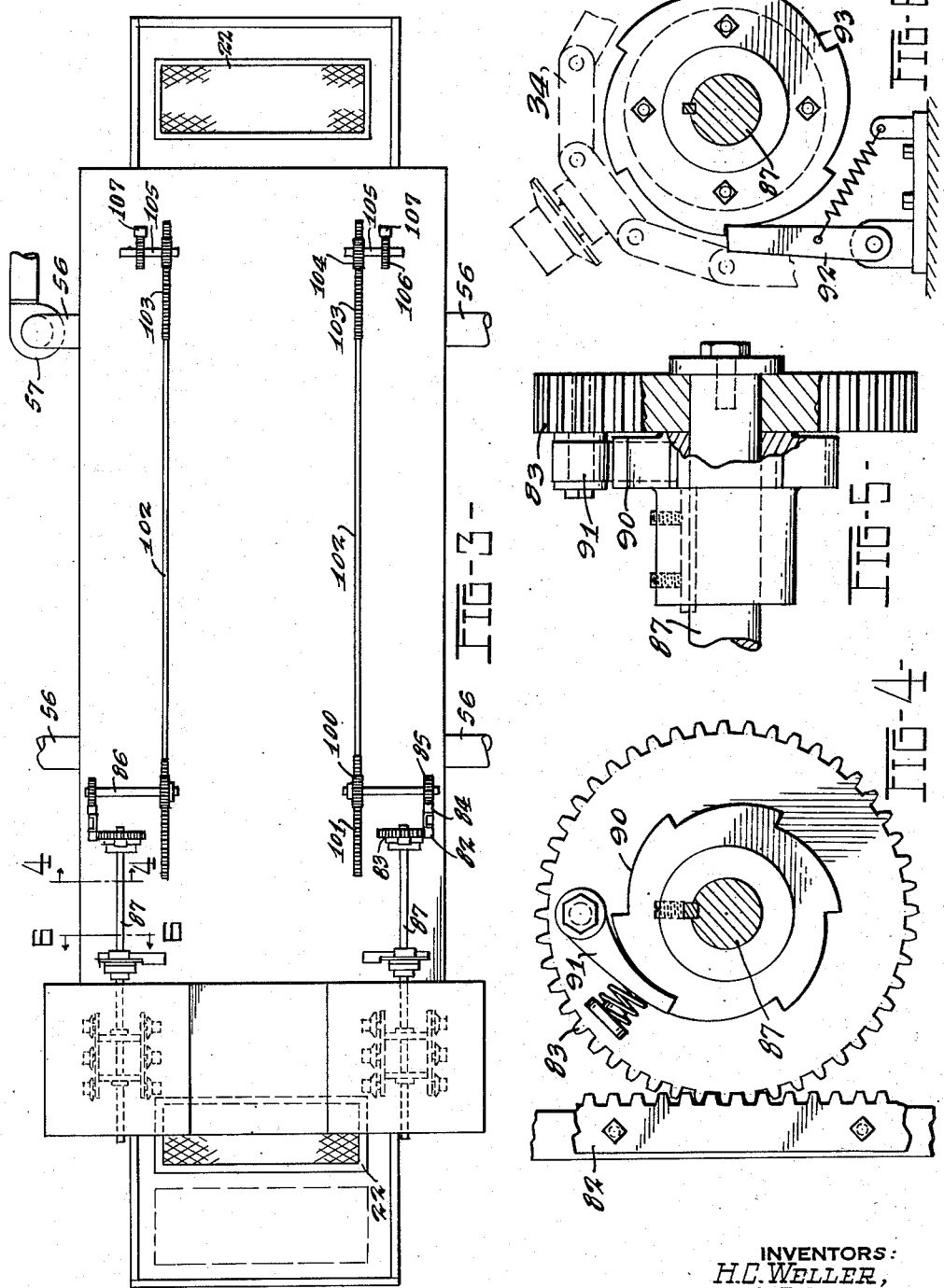

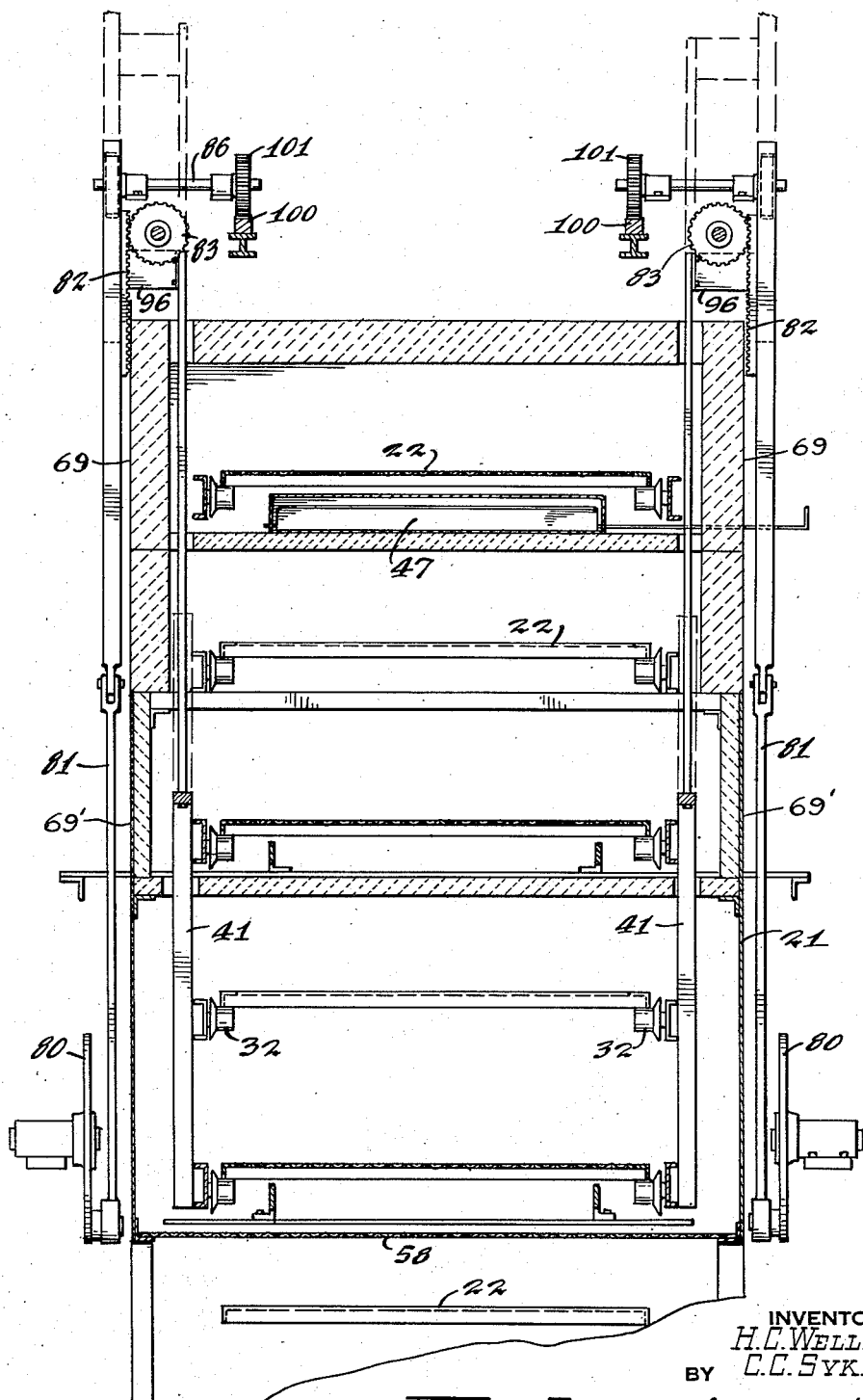

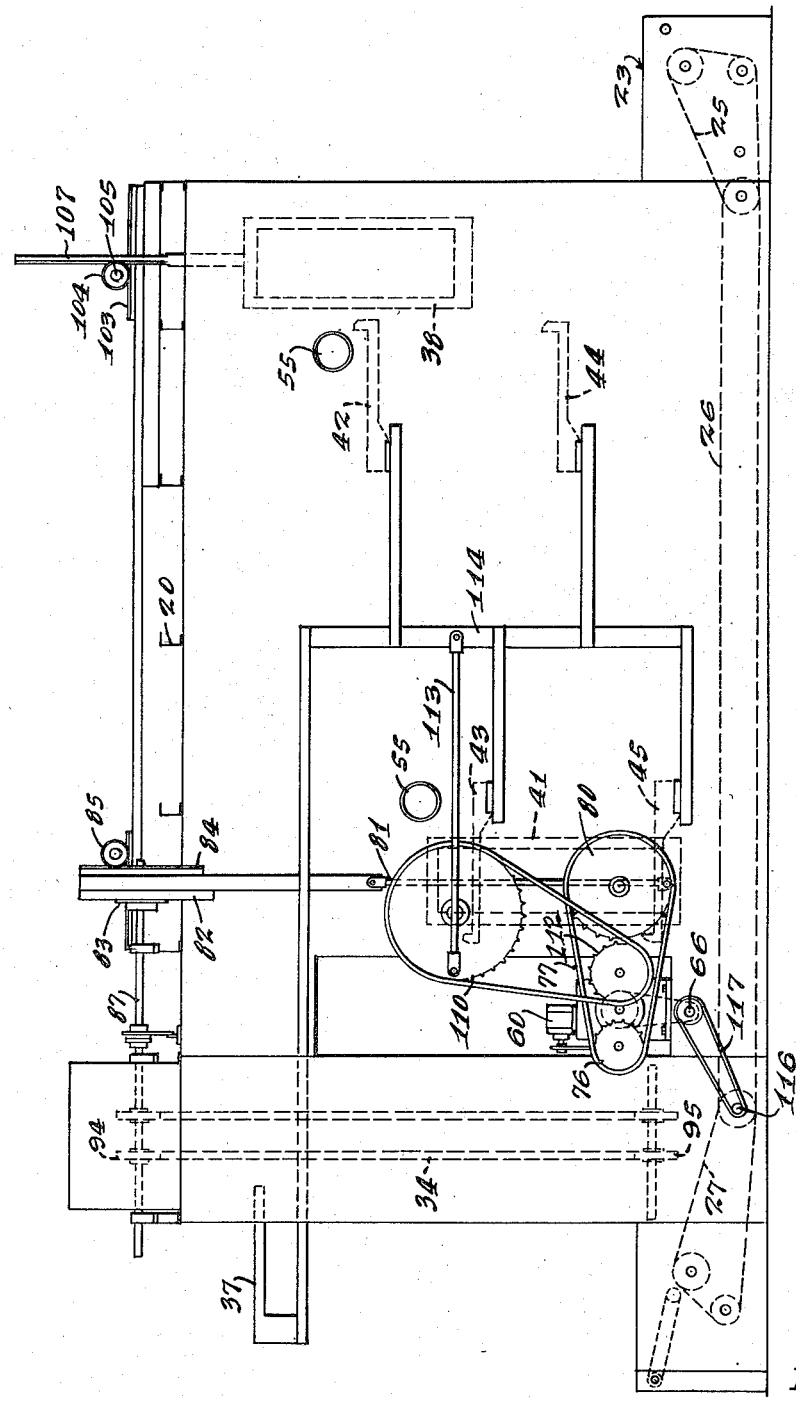

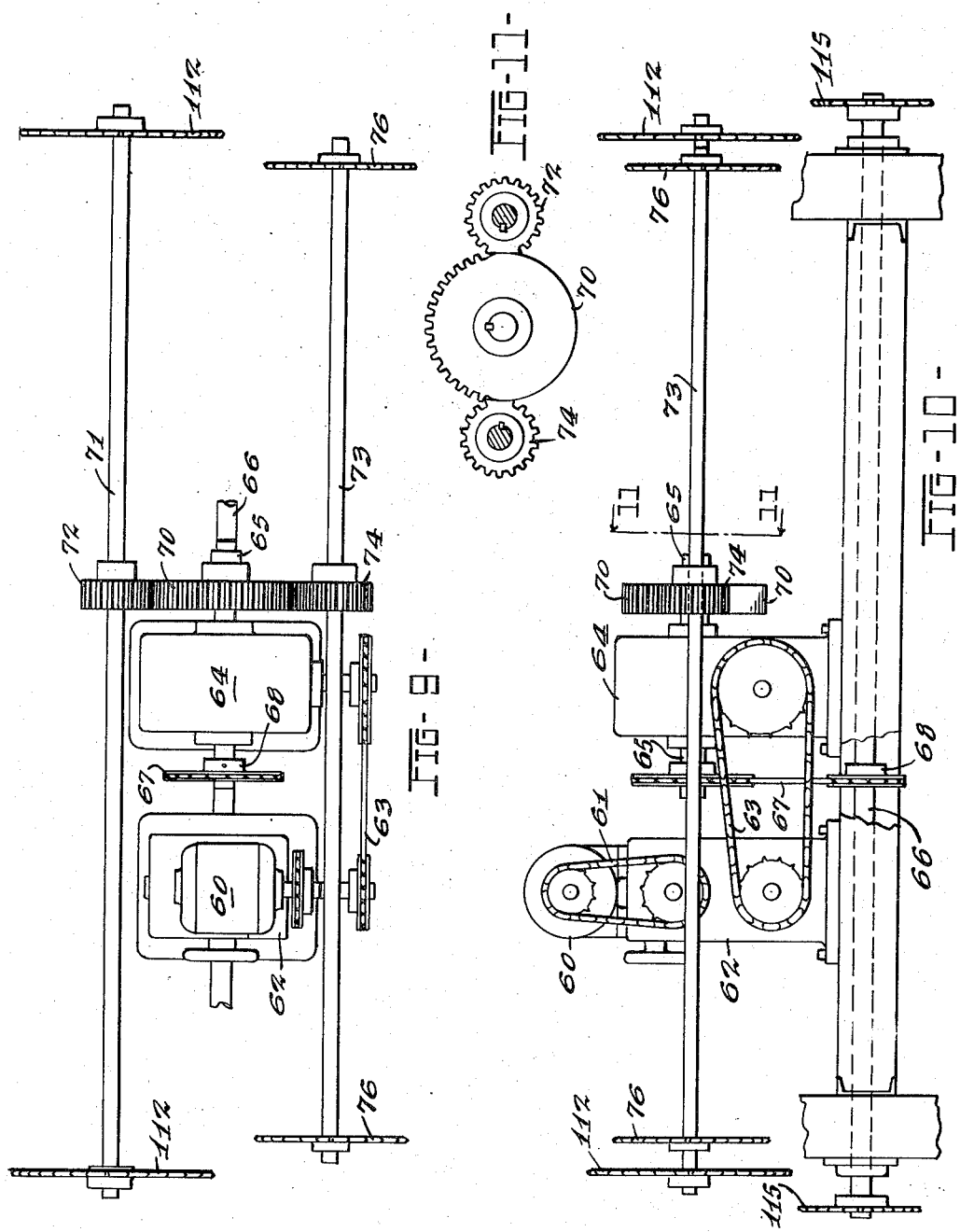

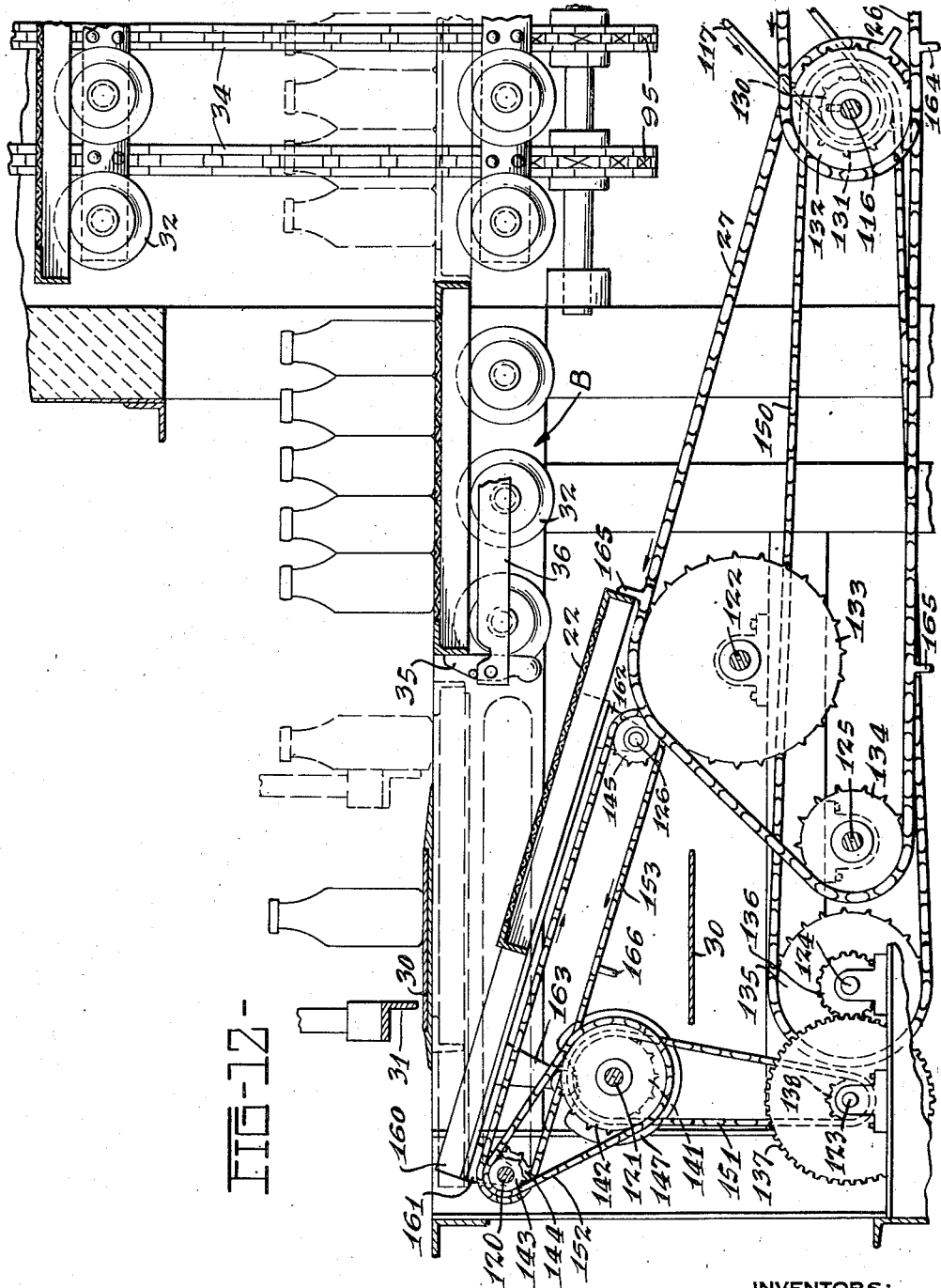

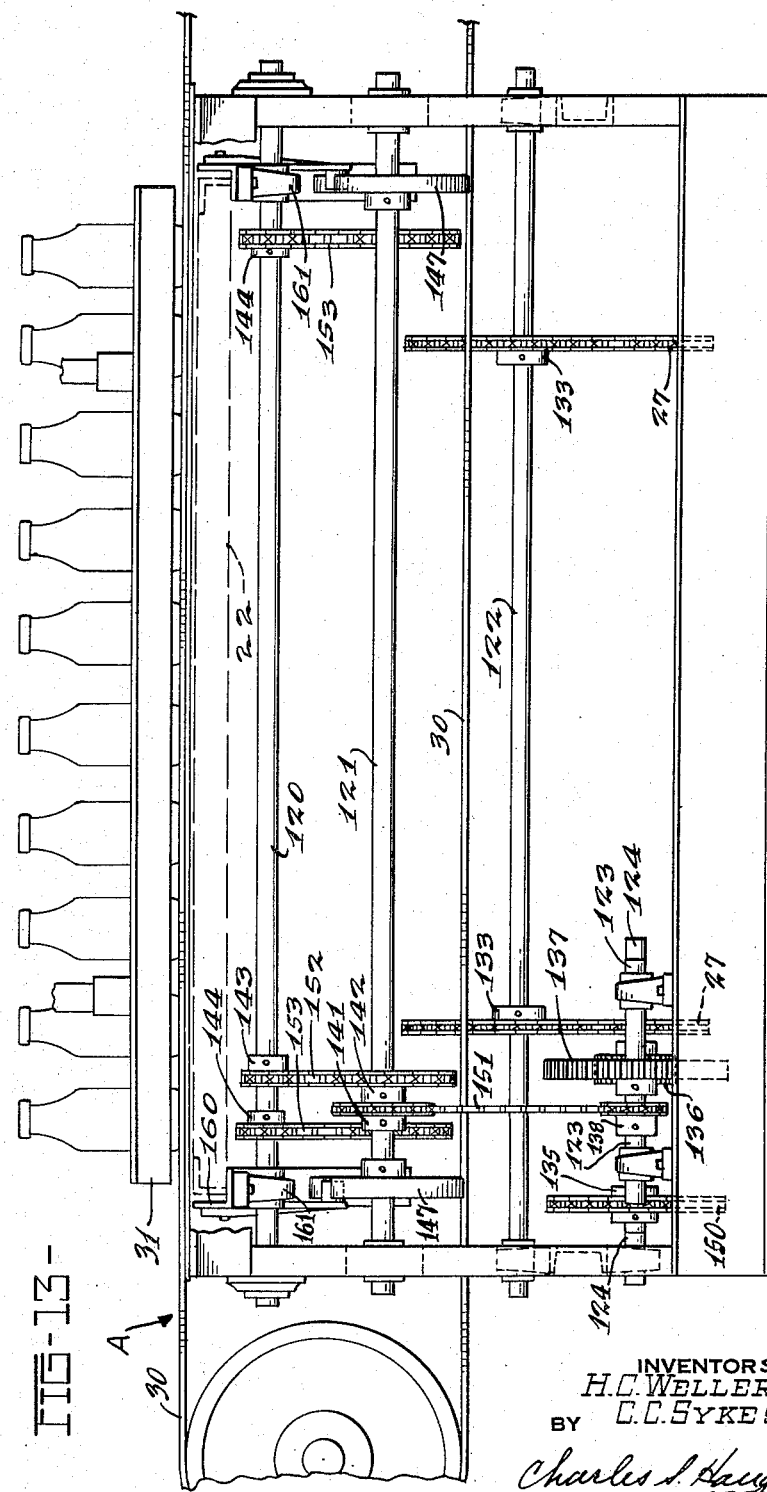

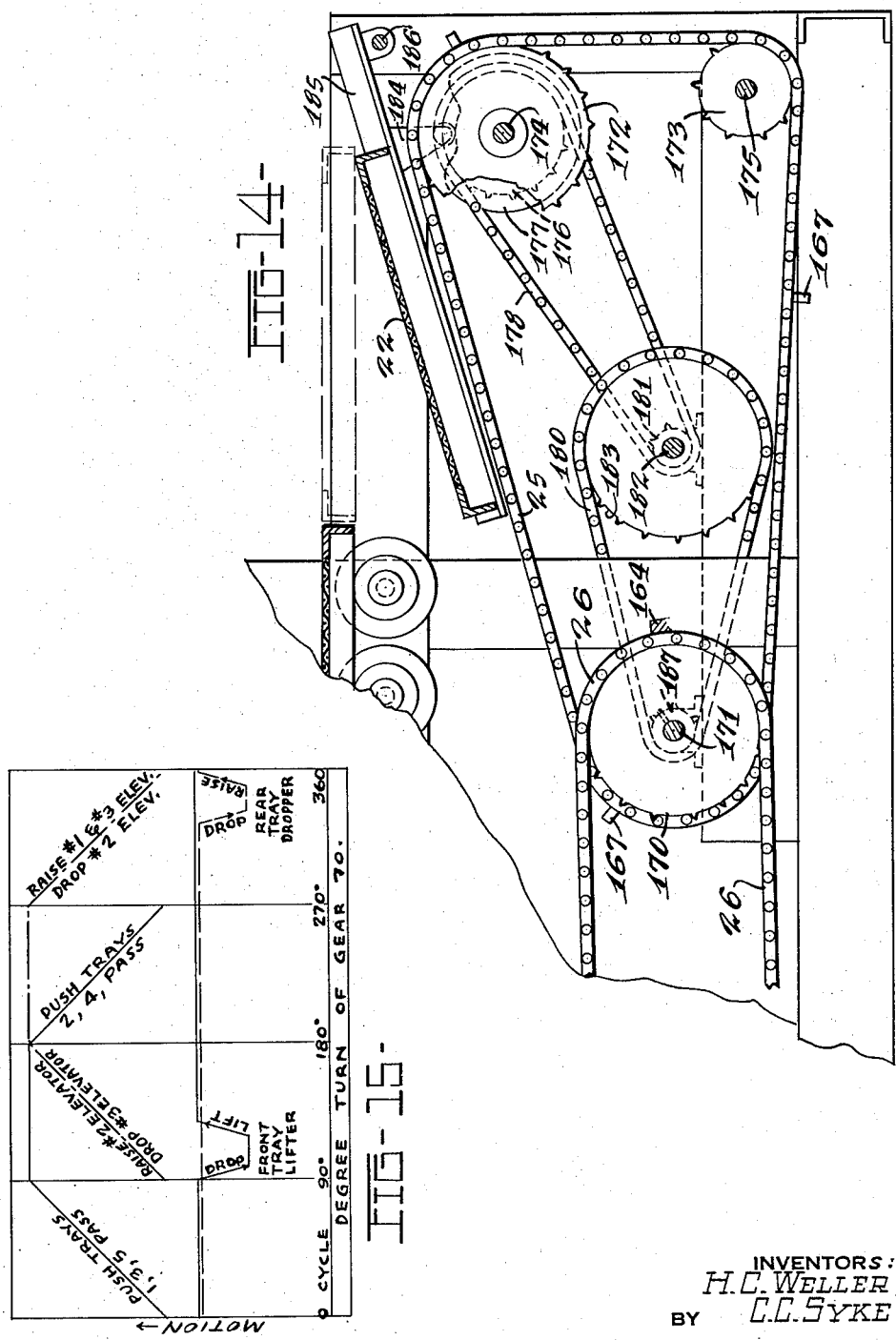

United States Patent Office 2,711,616
Patented June 28, 1955

2,711,616

GLASS LEHR

Harvey C. Weller and Clarke C. Sykes, Toledo, Ohio, assignors to Surface Combustion Corporation, Toledo, Ohio, a corporation of Ohio Application January 19, 1952, Serial No. 267,222

15 Claims. (Cl. 49—47)

This invention relates to the art of annealing glass and has resulted in an improved furnace or lehr for the annealing of glass. In the manufacture of glass ware it is essential that the ware be heated above the strain point— the highest temperature at which no appreciable strain in the ware is relieved over a long period of time—and to a temperature at which the glass is plastic, to relieve stress within the ware imposed during manufacture, i. e. shaping, of the ware. This is to prevent shattering of the glass due to locked in stresses which with relatively small temperature changes may be increased to stresses beyond the strength of the glass.

To accomplish the necessary anneal of glass ware and to produce ware having desirably low permanent internal stress, it is customary to subject the ware to annealing cycles of the order of one to two hours elapsed time, of which perhaps fifteen minutes will be at or about the annealing point and the balance of the time being consumed in heating uniformly to the annealing point and in carefully cooling therefrom to room temperatures.

The basic annealing cycle for such thermoplastic materials as glass is divided into three main stages:
1. Soaking at annealing temperature
2. Initial cooling through critical range, and
3. Subsequent cooling to room temperature.

The annealing temperature is generally about 15° F. above the annealing point, the temperature at which all stress is relieved in 15 minutes, to provide a factor of safety both in point of adequate time at temperature and tolerance of composition of the glass, with its resulting characteristics. The critical range is the temperature range from the annealing point to the strain point. The cooling portion of the cycle is thus divided into two parts, the upper of which is important because it is the rate of cooling through this critical range which determines the final residual stress in the ware. As the fully annealed ware cools through the critical range at a uniform rate, such as 0.8° F. per minute maximum for 1 inch thick soda-lime glass cooled from each side, the ware becomes annealed, or stress-free, while at an imbalance of temperature imposed by cooling. When the temperature of the ware again becomes uniform below the strain point, residual stresses will be imposed on the glass proportional to the temperature differentials present during cooling through the critical range. The residual stress in the glass will be theoretically equal to the loss of temporary stress from fully annealed glass due to plastic flow during cooling through the critical range in stage 2, but will be opposite in character. Upon cooling below the critical range, in stage 3, the permanent residual stress will no longer be effected, but faster cooling will impose a stress of its own on the glass during such cooling, again proportionate to the temperature differentials in the glass inherent in such rate of cooling, but these temporary stresses will be opposite in character or sign from the permanent stresses left in the glass at uniform temperature. What was a tensile surface stress during fast cooling in stage 3 will become a compressive permanent surface stress at room temperature.

Due to the shape of many items annealed, great care must be exercised in physical handling to avoid deformation or breakage.

Conventional modern lehrs for these operations are usually of the order of 100 feet long and handle the ware on continuous wire mesh belt conveyors, are difficult to heat economically, and require vast areas of floor space and expensive construction. The present invention is directed to an improved lehr and conveyor system for annealing of glass ware with marked reduction in floor space and many benefits in economy of operation and quality of product.

For a consideration of what we believe to be novel and our invention, attention is directed to the following portion of this specification and the drawing and claims thereof.

In the drawing:

Fig. 2 is a vertical sectional view of the lehr of Fig. 1 on line 2—2 thereof.

Fig. 3 is a plan view of the lehr showing drive elements located on the roof thereof.

Fig. 4 is a view of a drive ratchet shown on line 4—4 of Fig. 3.

Fig. 5 is a partially sectional view of the drive ratchet of Fig. 4.

Fig. 6 is a view of a holding dog of Fig. 3 on line 6—6 thereof.

Fig. 7 is a vertical sectional view of the lehr of Fig. 1 on line 7—7 thereof.

Fig. 8 is an elevation view of the lehr of Fig. 1 showing drive elements thereof.

Fig. 9 is a detail plan view of drive elements of the lehr.

Fig. 10 is a detail profile view of the drive elements of Fig. 9 taken on line 10—10 of Fig. 1.

Fig. 11 is a sectional view taken on line 11—11 of Fig. 10.

Fig. 12 is a detail view of the charge end of the lehr of Fig. 1.

Fig. 13 is a broken-away view of a portion of the apparatus of Fig. 12.

Fig. 14 is a detail view of the discharge end of the lehr of Fig. 1.

Fig. 15 is a graphic representation of the sequencing of drive elements of the lehr.

Figure 1:
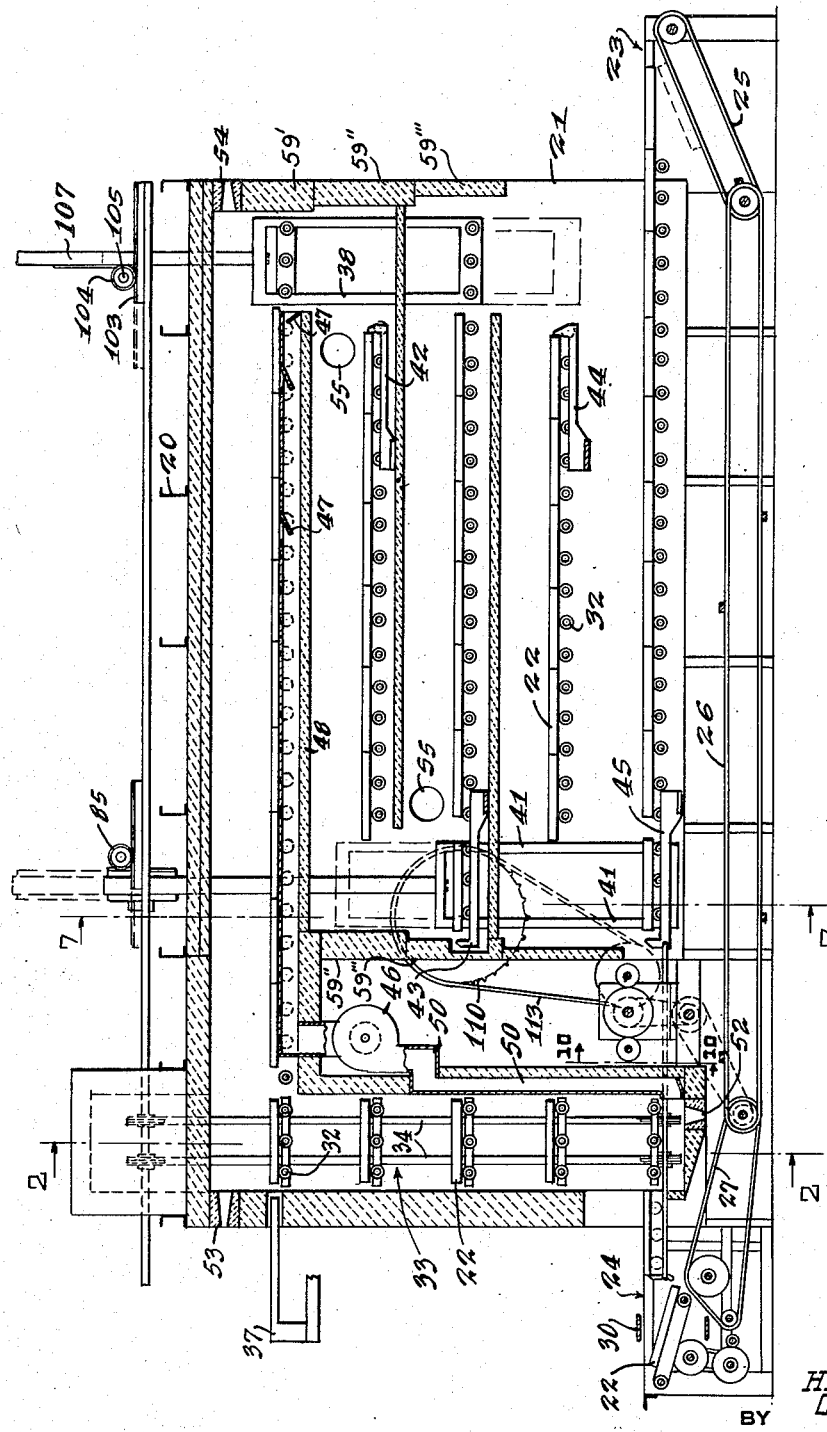
Fig. 1 is a vertical sectional view of a lehr embodying this invention.

The lehr disclosed herein to illustrate this invention comprises steel framework 20 and a shell or housing 21 forming an annealing chamber which is for the most part lined with insulation material. Ware to be annealed is carried through the annealing chamber on trays 22. After carrying ware through the annealing chamber, the trays are returned from the discharge end 23 of the furnace to the charge end 24 of the furnace by a series of conveyor belts 25, 26 and 27, preferably driven by timed drive chains.

Ware is loaded on the trays in a loading position at the charge end by a continuous belt-type stacker indicated generally at A in Fig. 13 of which the belt 30 is shown in Fig. 1 and the pusher 31 is shown in Fig. 12 together with the belt 30 and more detail as to the charge end 24. The ware is customarily carried before the tray loading position on a belt 30 then pushed off onto the tray by the pusher 31, successive rows of ware being pushed off as the tray is moved towards the lehr annealing chamber. The tray 22 is moved from the loading position by a tray charging means indicated generally at B in Fig. 12 on rollers 32 comprising a part thereof to a position in a tray elevator 33 at the front or charge end of the lehr, and it is there picked up by rollers 32 on elevator chains 34 and carried upwards in the elevator 33 to the top of the lehr. The portion of the tray charging means B for moving the tray from the loading position to the bottom of the elevator is shown as a dog 35 carried on an arm 36 to be described later in more detail. The dog 35 and the arm 36 constitute means for moving a tray next under the stacker A onto the tray elevator 33. When the trays reach the top position of the elevator they are pushed off of the rollers of the elevator and onto rollers in the annealing chamber which serve as a conveyor and carry the trays horizontally to the rear or back end of the lehr. A top, or first, pass pusher 37 is utilized to unload the elevator, and by pushing at one end of a row of trays at the top of the lehr, hereafter called the top or first pass of the lehr, the last tray of that pass is loaded onto rollers carried by a first lowering-elevator 38 at the rear of the lehr. The first lowering-elevator is lowered, with a tray on its upper support rollers, to a second position shown in dashed lines in Fig. 1 wherein its upper support rollers are aligned with rows of rollers on the lehr forming a conveyor for the trays in a second pass of the lehr. This second pass terminates on a second, or middle, lowering-elevator 41, and trays are loaded thereon by a pusher 42 which catches a tray on the first lowering-elevator and by pulling it off moves a row of trays along the second pass the width of a tray, thus depositing a tray on the top position of the second lowering-elevator, which top position is shown in dashed lines in Fig. 1. The deposited tray is then lowered to a third pass of the lehr by dropping the second lowering-elevator to the position shown in full lines, from which a third pass pusher 43 moves the third pass of trays on its conveyor rollers 32, again moving the end tray of the pass onto the first lowering-elevator, this time at the bottom position thereof. Both lowering-elevators have two tray positions separated by a pass depth, hence as the first lowering-elevator moves down with the tray from the first pass as heretofore described, it also carries down the tray from the third pass, and when the second pass pusher 42 unloads the top position tray from the first lowering-elevator, a fourth pass pusher 44 simultaneously unloads the bottom tray thereof, moving the fourth pass of trays and thus loading a tray onto the second lowering-elevator on the bottom thereof. Similarly, when the second lowering-elevator lowers a tray from the second pass to the third pass, it also lowers a tray from the fourth pass to the fifth pass, from whence a fifth pass pusher 45 unloads it pushing the fifth pass of trays one tray width towards the discharge end of the lehr. The last tray of the fifth pass is then moved into unloading position, shown in dashed lines in Fig. 14, where it is customarily unloaded by hand before the tray is dropped onto the return conveyor belt 25 which together with belts 26 and 27, returns the tray to the charge end of the lehr to start a new cycle through the lehr.

The ware initially loaded on the trays is ordinarily hot off the forming machines, and is to be brought to the annealing temperature, held at that temperature a short time to remove evanescent stress then slowly cooled at a controlled rate to obtain the desired residual stress. When the lehr is used as a simple annealing lehr, the still hot ware from the forming operations is moved into the bottom of the elevator 33 and is brought to annealing temperature as it rises in the elevator. A circulating fan or blower 46 draws gases from along the first pass through adjustable inlets 47 and duct 48, and delivers the gases through duct 50 to discharge outlets 51 next under the lower tray position of the elevator, thus establishing an atmosphere of substantially constant temperature surrounding trays on the elevator 33 and on the first pass conveyor in the lehr.

In some cases it may be desirable to heat the gases circulated in duct 50, preferably by addition of combustion gases thereto as by an air heater or a burner, not shown, arranged to discharge into the duct 50, this serving to continuously add to the volume of gases in the lehr and by downward displacement thereof preventing cold air infiltration into the lehr. It is found preferable to apply heat by burners 52 at the bottom of the elevator, these burners preferably being aligned with the outlets 51 to provide a uniform and tempered heat source for the ware to be heated. The burners 52 are preferably controlled or adjusted to bring the ware uniformly to the annealing temperature, about the maximum temperature of the desired annealing cycle, near the top of the elevator, thus constituting the elevator shaft a heating, or temperature equalization, zone. A second series of burners 53 is adapted to supply heat to the circulating gases as they move through the first pass along the top of the lehr. By proper selection between and control of the burners 53 and burners 54 at the far end of the first pass, together with adjustment of the inlets or dampers 47, the temperature distribution along the top pass may be controlled to give the proper annealing time and temperature for the particular ware being annealed. The cooling rate for the ware is obtained by adjustment of the dampers 47 and by utilization of less thick insulation on the walls forming the several passes as the ware is moved toward the discharge end 23 of the furnace, or lehr. The variations of insulation thickness are illustrated in Fig. 1 by portions 59', 59", and 59"' which are successively thinner towards lower passes for the ware. In Fig. 7, a vertical sectional view at the second lowering-elevator, the insulation on the side walls is thinner in portions 69' than in portions 69 thereabove. Dampers 47 may be adjusted to control distribution of hot recirculating gas along the first pass, and exhaust ports 55 may be adjusted to control the volume of gas exhausted through ducts 56 by blowers 57, by suitable blower controls or duct valves, thus adjusting and affecting temperature distribution in the lower passes of the lehr. Hot gases drawn through the ports 55 will be displaced by cool air from below the screen 68 below the fifth pass, thus cooling the ware to hand temperatures for hand unloading at the discharge end 23.

The effective length of the respective passes is preferably designed to bring the ware to the end of the second annealing stage, the strain point, at the end of the second, or third, pass so that the cooling rate may then be adjusted in the next lower pass for the final stage of the anneal.

When it is desired to use the lehr as a decorator whereto the ware is loaded cold and heated to the proper temperature, the burners 54 will ordinarily be fired at a much greater rate than the burners 53, thus supplying more heat to the lehr than for ordinary annealing operations when the burners 54 are preferably not used. It will be understood that the temperatures used for decorating will ordinarily be higher than those used for annealing, and the maximum temperature will usually be found further down the first pass. The control of temperatures is of course made easier by passing the ware first up a heating "chimney" such as the elevator, and utilizing the top pass, the top of the chamber wherein stack action is found, as a soaking zone before cooling is provided as the ware is lowered for discharge.

The means for driving the conveyor system of this lehr may be a single motor 60 of relatively low horsepower, about one horsepower being sufficient for a unit built with an effective length of about 100 feet, the actual overall length of the unit being only about 32 feet due to the multiple pass conveyor system. A second motor 49 is utilized to turn the blower 46 in the recirculation duct system.

The drive motor 60, through a chain 61 drives a variable speed changer 62 which in turn through a belt 63 drives a speed reducer 64. One end of the drive shaft 65 of the speed reducer turns a belt conveyor system drive shaft 66 through a chain 67, it being understood that the shaft 66 will be driven at a constant speed corresponding to the adjustment of the variable speed changer 62. The other end of the speed reducer drive shaft 65 supports an intermittent drive gear 70 which in turn drives, at alternate times by its continuous turning, a tray pusher main drive shaft 71 through its intermittent driven gear 72, and an elevator and lowering-elevator main drive shaft 73 by its intermittent driven gears 74.

The elevator and lowering-elevator drive mechanism from the main shaft 71 comprises drive sprockets 76 at either side of the lehr, the drive system being duplicated at either side of the lehr thereby avoiding the whip effect of relatively long shafts. The sprockets 76, through chains 77, drive large crank arm sprockets 80 which in turn move their crank arms 81 and racks 82 and 84 at the upper end thereof. Elevator drive pinions 83 on shafts 87 are moved by the racks 82 as the crank arms 81 are moved up and down. Drive ratchet devices on shafts 87, comprising ratchet wheels 90 and spring operated pawls 91 illustrated in detail in Figs. 4 and 5, are utilized to provide an intermittent but always oneway, turning motion, when taken with the stop dogs 92 and ratchet wheels 93 of Fig. 6 to prevent reverse motion in the shafts 87. The shaft 87 through sprockets 94 thereon move drive chains 34 which carry rollers 32 up through the heating zone of the elevator shaft, over the sprockets 94, down to idler sprockets 95 at the bottom of the elevator shaft and then back again, the rollers 32 on these elevator chains 34 constituting supports for trays 22 being moved up the elevator and into the lehr annealing chamber.

Support arm 96 secured to the racks 82 directly supports the framework of the second lowering-elevator 41 which is moved up or down with each one-half revolution of the sprocket 80, carrying trays in the upper and lower portions of the lowering-elevator down one pass on the downward stroke.

The crank arms 81 also move other racks 84 which, in turn, turn pinions 85 on shafts 86, and other pinions 100 on the shaft 86 move other, horizontal, racks 101 on bars 102 the other ends of which support racks 103 which move pinions 104 and 106 on shafts 105. Pinions 106 move racks 107 which in turn move the framework of the first lowering elevator 38, the mechanism as shown being adapted to move the first lowering-elevator up as it moves the second lowering-elevator down, and to move the second lowering-elevator up as it moves the first lowering-elevator down.

As now appears from the foregoing, as the intermittent gear 70 makes a full revolution, each of its side gears 72 and 74 also makes a full revolution, but only one at a time. Thus through the mechanical chain of events the elevator is prevented from moving by the dog 92 while the first lowering-elevator moves down and the second lowering-elevator moves up, then all lowering-elevator and elevator mechanism is still while trays are moved in the second and fourth passes, then the trays in the passes are still while the first lowering-elevator moves up, the second lowering-elevator moves down and the elevator moves up, and again the elevators and lowering-elevators are still while trays are moved in the first, third and fifth passes. The means for moving the trays in such synchronization with the elevator and lowering-elevators comprises crank arm sprockets 110 which are driven by chains 111 from sprockets 112 on shaft 71, and the crank arm sprockets 110 by crank arms 113 move frames 114 in horizontal guides therefor, not shown, said frames being adapted to move the aforementioned pass pushers 37, 42, 43, 44, 45, and the arms 36, these being extensions of the fifth pass pushers 45.

The conveyor belts, or chains, 25, 26 and 27 receive their power from the motor 60 through shaft 66 as heretofore described and sprockets 115 at the ends of shaft 66 drive shaft 116 through chains 117, making shaft 116 a primary drive shaft for the conveyor belt system and the loader system to be described. Shaft 116 supports several sprockets in pairs, sprockets 132 driving belt or chain 26, sprockets 132a of similar size driving belt 27, and sprockets 131 which drive the conveyor mechanism through chain 150. Belt 150 drives shaft 124 through sprockets 135, and thus in turn drives a gear 136 which drives a gear 137 on shaft 123.

Sprocket 138 on shaft 123 turns sprocket 141 on shaft 121 by chain 151, and a sprocket 142 on shaft 121 turns a sprocket 143 on shaft 120. Shaft 120 serves as a pivot for a tray loader, or support, frame 160 which pivots on bearing supports 161. The tray lifter frame 160 is raised and lowered by cam followers 163 which follow cams 147 at either end of the shaft 121. Belts 153 are moved continuously on the frame 160 over sprockets 144 on shaft 120 and sprockets 145 on stub shafts 126 which are supported on the frame 160 by bearing supports 162. Dogs 164 on belt 26 move trays positively on said belt, dogs 165 move trays positively along belt 27, the dogs being spaced by an idler shaft 125 and sprockets 134 which allow use of a longer belt 27, so that the arrival of the dogs is timed to pick up trays from belt 26 and deliver them at the proper time to the tray loader belts 153 whose dogs 166 serve to unload the tray when the frame 160 is in the raised, horizontal position under the loader. The reduction gear set comprising gears 136 and 137 is designed to provide the desired loading speed for the loader, being co-ordinated with the loader pusher 31 and the loader belt 30 by ordinary gears or the like, not shown.

The belt 26 which is driven through shaft 116 also serves to drive the discharge, or unloader, mechanism at the rear of the lehr. The belt 26 passes around two sprockets 170 on an idler shaft 171, and two other sprockets 170 of similar size are driven from the shaft 171 and in turn drive belt 25 around idler sprockets 172 and 173 supported on shafts 174 and 175, respectively. The dogs 167 on belt 25 are so located and timed as to unload a tray 22 at the proper time. A tray unloader or dropper frame 185 hinged on pivot shaft 186 is moved up to horizontal position or down to tray removal position by means of cam followers 184 which follow cams 177 on shaft 174, the cams being individually driven by sprocket 176 which is a part thereof, chains 178 and 180 and sprockets 183 and 181 on shaft 182 and sprocket 187 on, and driven by, shaft 171. The sprockets 187, 183, 181 and 176 forming part of a speed reduction system having a function parallel to that of reduction gears 136 and 137 at the charge end loader mechanism.

The sequence of operations, or mechanical movements, is illustrated by Fig. 15. Starting at an arbitrary starting point in the conveying cycle where the first pass pusher starts to move trays in the first pass, with the motor 60 operating at a constant speed, as the crank arm sprocket 110 makes half a revolution, the crank arm 113 moves the frame 114 and its attached pass pushers 37, 42, 43, 44, 45 and loader pusher 36 are simultaneously moved toward the discharge end of the lehr at a rate which varies as the harmonic drive mechanism requires from an initially slow forward motion to a maximum rate of forward motion, then slowing to a stop, this, being by virtue of the crank arm type of mechanism as is per se well known. During this motion, which corresponds to a 180° turning of the intermittent gear 70 as shown on Fig. 15, pushers 37, 43, 45 and 36 will be moving trays while pushers 42 and 44 are moving into position in preparation for moving trays. During the next 180° turn of gear 70 the frame 114 remains motionless, the drive ratchet of Fig. 4 is allowed to slip and the dog 92 prevents downward motion of the elevator while the first, or rear, lowering-elevator 38 moves down and the second lowering-elevator 41 moves up. On the next 180° turn of the gear 70, between 360° and 540° in Fig. 15, the frame 114 is returned to its starting position, pushers 42 and 44 moving trays in the second and fourth passes. On the last 180° of Fig. 15 the crank arm sprocket 80 again moves, and the first lowering-elevator 38 rises empty while the second lowering-elevator 41 moves trays downward one pass; at the same time the drive ratchet of Fig. 4 raises the elevator 33. The tray lifter frame 160 of Fig. 12 is adapted to drop and receive a tray, then raise it to horizontal position immediately after the pusher 36 has moved the last tray off of the frame 160 so that the loader of which the belt 30 and the pusher bar 31 are a part have a maximum time in which to load the next tray. At the discharge end of the lehr a maximum of time is desired for the tray at the rearmost point of the fifth pass for the usual hand unloading of the tray, hence the unloader frame 185 is adapted to drop a tray at the last moment before a new tray is moved into its position by the fifth pass pusher 45.

The mechanical tray conveying system of this lehr requires a minimum of power, due in part to the use of the harmonic type of motion to start and stop motions. This type of motion lessens the danger of loss of ware being annealed through breakage due to sudden starts and stops, and due to rubbing contact of the ware and the like. Similar results are obtainable with equivalent apparatus such as hydraulic apparatus having properly end-cushioned cylinders and timing controls.

The cycle disclosed for advancing ware through the lehr is characterized by an "interrupted" pusher cycle which pushes half the passes on half its cycle, stops while elevators and lowering-elevators are moved, then pushes the rest of the passes, again stopping for elevator or lowering-elevator motions. With a practical limit placed upon the rate at which a given tray may be accelerated or advance, there is then a limit upon the rate at which the lehr as disclosed will discharge trays. This discharge rate may be doubled by use of a somewhat more expensive and complicated "overlapping" cycle in which the frame type balanced and reciprocating lowering-elevators disclosed are replaced by chain type lowering-elevators such as the elevator disclosed, the lowering-elevators then each being designed to carry trays on every pass spacing and to move always downward. To prevent override of such lowering-elevators, landing bars may be placed at each pass elevation or landing in the lowering-elevators to stop the trays at the proper height to be pushed onto the rollers forming the conveyor of the adjacent pass. The pushers will then be adapted to push all passes simultaneously as by two opposed crank arms on the crank arm wheel 110, each pushing alternate passes of trays, or by use of an idler pinion and opposed racks, the pushers on adjacent passes may thus be controlled in like manner. With such an overlapping cycle the pushers can all push on the first 180° turn of the wheel 110, then the elevator and lowering-elevators can move during the second 180°. This cuts the elapsed time for a complete conveying cycle in half without increasing the unit speed of any motion. In fact the elevator speed will be cut in half, or only every other pass spacing will carry a tray. In both cases the desirable result is obtained of substantially continuous motion of ware across a heating zone at the top of a furnace, or lehr, with subsequent cooling as the ware is conveyed downward. This makes maximum use of the stack action in a furnace, which tends to stratify gases therein with hotter gases at the top of the chamber. With a closed-top furnace, and an elevator shaft which is utilized to heat the ware or to equalize the temperature thereof at the desired annealing temperature, there is no loss of heating gas due to convection by the furnace stack action, and with the various devices disclosed it is a relatively simple matter to vary the ware temperature properly as it passes downward through the body of the lehr in its cooling cycle. Since it is easier to vary and control cooling rates and temperatures from pass to pass than it is along a given horizontal pass, due to the inherent stratification of gases in a vertical chamber and the drift of gases always present in horizontal chambers, the vertical-type lehr herein disclosed is well adapted to design around a given annealing cycle for ware, for example, using the elevator to bring the ware uniformly to the annealing temperature, using the first pass for the first stage of annealing the second, or the second and third passes for the second stage annealing, and the balance of the lehr for the third stage annealing to bring the ware safely down to room temperatures suitable for packaging and the like.

The tray return conveyor system is designed to allow the trays to remain a maximum time at the discharge end for unloading and to rapidly return trays to the charge end of the furnace, thus avoiding a large float of expensive empty trays returning to the charge end loading station. The stacker or loader partially disclosed in the drawing is a conventional belt type conveyor stacker having a pusher adapted to push ware from a continuously moving belt onto the slowly advancing trays. As the last row of ware is pushed off onto a tray as it moves toward the furnace, the belt 30 continues to advance ware, hence the tray frame 160 must drop, receive a tray, rise and move the new tray into position during the normal interval between pushing rows of ware onto the trays. The speed of the belts 26, 27, 153, etc., must be determined accordingly and be synchronized with that of the stacker belt 30 and its pusher 31. The adaptation of the belt-and-pusher type of ware stacker to a tray conveyor type of lehr requires separate conveyor systems for advancing the tray as it is loaded and for moving the trays when delivered, loaded to the lehr proper. The apparatus herein disclosed is believed well suited for such adaptation, thus making possible the new combination of periodically pushed trays and a continuously moving belt type stacker.

We claim:
1. Apparatus for annealing glassware and the like comprising a housing, conveyor means comprising vertically spaced horizontal conveyors for conveying ware supporting trays through said housing in alternately opposed horizontal directions from the top to the bottom of said housing, and lowering-elevators at the ends of said horizontal conveyors for lowering trays from one of said horizontal conveyors to the next lower horizontal conveyor, return conveyor means for returning said trays from the bottom to the top of said housing, and insulation means on said housing and surrounding at least part of said horizontal conveyors for preventing loss of heat from said housing, said insulation means being arranged to be less effective next adjacent the lower of said horizontal conveyors.

2. Apparatus according to claim 1 wherein said return conveyor means comprises an elevator for raising trays to the topmost of said horizontal conveyors, a housing for said elevator forming with said first mentioned housing a lehr having closed sides and a top, wall means next under said topmost horizontal conveyor forming with said first mentioned housing a heating tunnel through which said topmost horizontal conveyor is adapted to move trays, circulating means for circulating a stream of heating gases in a substantially closed cycle which includes said tunnel and said elevator housing, and burner means adapted to supply heated gases to said stream.

3. Apparatus according to claim 1 wherein said return conveyor means comprises a tray elevator, and said housing defines an outlet for trays, and comprising a continuous belt type stacker for loading ware onto said trays, and means comprising a movable frame adapted to receive trays from the outlet of said housing when in a lowered position and to charge said trays toward said elevator and next under said stacker when in a raised position, and a continuous belt carried by said frame and continuously moving in the direction and at the speed necessary to so charge said trays, said belt having tray engaging means associated therewith for moving a tray when said frame is in said raised position.

4. Apparatus according to claim 3 wherein said movable frame is hingedly supported by a hinge shaft which also serves to support said continuous belt carried by said movable frame, whereby said movable frame swings on said hinge shaft from such raised to such lowered positions, and comprising a cam, a cam follower on said frame adapted to follow the contour of said cam, and cam turning means operably synchronized with said tray engaging means to lower the frame from its raised position to its lowered position and to raise the frame from its lowered position to its raised position at the proper time and speed to supply a new tray next under the stacker as the last previous tray is loaded and moved therefrom.

5. Apparatus according to claim 1 wherein said return conveyor means comprises a tray elevator for raising trays to the topmost of said horizontal conveyors, and said housing forms an outlet for discharge of trays therefrom, and comprising a continuous belt type stacker for loading ware onto said trays, means comprising a movable frame adapted to receive trays from the outlet of said housing when in a lowered position and to charge said tray toward said elevator and next under said stacker when in a raised position, and a continuous belt carried by said frame and continuously moving in the direction and at the speed necessary to so charge said trays, said belt having tray engaging means associated therewith for moving a tray when said frame is in said raised position, and said conveyor means comprises a main intermittent gear and alternately driven elevator and pusher gears, a plurality of pushers each adapted to push a row of trays on one of said horizontal conveyors, means connecting said pusher gear to said pushers each adapted to push a row of trays on a single horizontal conveyor in said housing, means connecting said elevator gear to move said elevator and said lowering-elevators and means connecting said main intermittent gear to continuously drive said continuous belt.

6. Apparatus for annealing glassware and the like comprising a housing, conveyor means for conveying ware supporting trays through said housing in alternately opposed horizontal directions from the top to the bottom of said housing, and return conveyor means for returning said trays from the bottom to the top of said housing, said conveyor means comprising vertically spaced horizontal conveyors for said trays, and lowering-elevators at the ends of said horizontal conveyors for lowering trays from one of said horizontal conveyors to the next lower horizontal conveyor, and said return conveyor means comprising a tray elevator for delivering trays to the topmost of said horizontal conveyors, tray charging means for charging trays onto said elevator, a return conveyor for delivering trays to said tray charging means, and tray discharging means for delivering trays from the lower of said horizontal conveyors to said return conveyor, said tray discharging means comprising a hingedly supported frame, means synchronized with said lower conveyor for moving said frame from a raised position to a lowered position after deposit of a tray thereon by said lower conveyor, and from the lowered position back to the raised position prior to delivery of a tray from the lower of said horizontal conveyors to said frame, and means associated with said return conveyor for unloading a tray from said frame while it is in said lowered position.

7. Apparatus for annealing glassware and the like comprising a housing, means comprising vertically spaced horizontal conveyors for conveying ware supporting trays through said housing in alternately opposed horizontal directions from the top to the bottom of said housing, and lowering-elevators at the ends of said horizontal conveyors for lowering trays from one of said horizontal conveyors to the next lower horizontal conveyor, means comprising a tray elevator for delivering trays to the topmost of said horizontal conveyors, tray charging means for charging trays onto said elevator, a return conveyor for delivering trays to said tray charging means, and tray discharging means for delivering trays from the lowest of said horizontal conveyors to said return conveyor.

8. Apparatus according to claim 7 wherein said tray charging means comprises a hingedly supported frame, means synchronized with said return conveyor for moving said frame from a raised position to a lowered position, and from its lowered position to its raised position after delivery of a tray from said charging means to said elevator, means associated with said return conveyor for moving a tray onto said frame, when it is in its lowered position, and means for moving said tray from said frame when it is in its raised position.

9. In apparatus for annealing glassware and the like comprising a housing having substantially closed top, side and end walls, an elevator in said housing at one end thereof for raising ware supporting trays to the top of said housing, a vertical series of horizontal conveyors for conveying said trays from said elevator through said housing in alternately opposed horizontal directions, and lowering-elevators at the ends of said horizontal conveyors for lowering trays from one of said horizontal conveyors to the next lower of said horizontal conveyors, the combination which comprises circulating means for circulating an atmosphere around trays on said elevator and on the topmost of said horizontal conveyors, heating means for maintaining said atmosphere at substantially uniform temperature, and wall means in said housing and between said elevator and topmost horizontal conveyor and the balance of said horizontal conveyors substantially isolating said atmosphere from the atmosphere in the balance of said housing.

10. In apparatus for annealing glassware and the like comprising a housing having substantially closed top, side and end walls, an elevator in said housing at one end thereof for raising ware supporting trays to the top of said housing, a vertical series of horizontal conveyors for conveying said trays from said elevator through said housing in alternately opposed horizontal directions, and lowering-elevators at the ends of said horizontal conveyors for lowering trays from one of said horizontal conveyors to the next lower of said horizontal conveyors, the combination which comprises heating means for maintaining an atmosphere of substantially constant temperature surrounding trays on said elevator and on the topmost of the horizontal conveyors, and insulating wall means in said housing between said elevator and topmost horizontal conveyor and the balance of said horizontal conveyors substantially isolating said atmosphere from the atmosphere in the balance of said housing.

11. In apparatus for annealing glassware and the like comprising a housing having substantially closed top, side and end walls, an elevator in said housing at one end thereof, for raising ware supporting trays to the top of said housing, a vertical series of horizontal conveyors for conveying said trays from said elevator through said housing in alternately opposed horizontal directions, and lowering-elevators at the ends of said horizontal conveyors for lowering trays from one of said horizontal conveyors to the next lower of said horizontal conveyors, the combination which comprises wall means in said housing between said elevator and topmost horizontal conveyor and the balance of said horizontal elevators, circulation means comprising a duct for circulating atmosphere through said elevator and topmost horizontal conveyor, and burner means for supplying combustion gases to atmosphere from said duct to mix with and supply heat to the same.

12. In apparatus for annealing glassware and the like comprising a housing having substantially closed top, side and end walls, an elevator in said housing at one end thereof for raising ware supporting trays to the top of said housing, a vertical series of horizontal conveyors for conveying said trays from said elevator through said housing in alternately opposed horizontal directions, and lowering-elevators at the ends of said horizontal conveyors for lowering trays from one of said horizontal conveyors to the next lower of said horizontal conveyors, the improvement consisting in means for controlling the temperature of the atmosphere surrounding trays on said elevator and on the topmost of the horizontal conveyors to a maximum as compared to the temperatures surrounding trays on lower horizontal elevators, wall means substantially isolating said atmosphere from the atmosphere in the balance of said housing, and means for admixing hot gases with said atmosphere of substantially uniform temperature whereby to continuously furnish an excess of gases to said housing and to maintain such substantially uniform temperature.

13. Apparatus for annealing glassware and the like comprising a housing, conveyor means comprising vertically spaced horizontal conveyors for conveying ware supporting trays through said housing in alternately opposed horizontal directions from the top to the bottom of said housing, and lowering-elevators at the ends of said horizontal conveyors for lowering trays from one of said horizontal conveyors to the next lower horizontal conveyor, return conveyor means for returning said trays from the bottom to the top of said housing, means for controlling the temperature of gases in said housing to a maximum temperature along the topmost of said horizontal conveyors and to successively lower temperatures along successively lower horizontal conveyors in said housing, said temperature controlling means comprising burner means arranged to apply heat to gases circulating next along said topmost horizontal conveyor, and insulation means for preventing loss of heat from said housing, said insulation means being arranged to be less effective next adjacent the lower of said horizontal conveyors.

14. Apparatus according to claim 1 wherein said return conveyor means comprises a tray elevator for raising trays to the topmost of said horizontal conveyors, and comprising a stacker for loading ware onto said trays, and means for moving said trays next under said stacker at a substantially continuous rate whereby ware may be uniformly loaded onto said trays before delivery thereof to said elevator.

15. Apparatus according to claim 14 wherein said stacker is of the continuous belt type whereby successive rows may be pushed onto said trays as they are advanced toward said elevator.

References Cited in the file of this patent

UNITED STATES PATENTS

| | | |
|---|---|---|
| 270,929 | Brockunier et al. | Jan. 23, 1883 |
| 1,152,969 | Quimby | Sept. 7, 1915 |
| 2,129,057 | Greene | Sept. 6, 1938 |
| 2,133,783 | Merrill | Oct. 18, 1938 |
| 2,370,381 | Vaughan | Feb. 27, 1945 |

FOREIGN PATENTS

| | | |
|---|---|---|
| 13,907 | Great Britain | June 15, 1907 |